(12) United States Patent
Kurotsu (10) Patent No.: US 8,908,238 B2
(45) Date of Patent: Dec. 9, 2014

(54) ILLUMINATION DEVICE, IMAGE READING APPARATUS, AND IMAGE FORMING APPARATUS

(71) Applicant: KYOCERA Document Solutions Inc., Osaka-shi, Osaka (JP)

(72) Inventor: Yoshihiko Kurotsu, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/218,778

(22) Filed: Mar. 18, 2014

(65) Prior Publication Data

US 2014/0293368 A1    Oct. 2, 2014

(30) Foreign Application Priority Data

Mar. 28, 2013   (JP) ................. 2013-069778

(51) Int. Cl.
| | | |
|---|---|---|
| *H04N 1/04* | (2006.01) | |
| *H04N 1/028* | (2006.01) | |
| *F21V 8/00* | (2006.01) | |

(52) U.S. Cl.
CPC ............ *H04N 1/0288* (2013.01); *G02B 6/0096* (2013.01)
USPC ........... 358/474; 358/475; 358/509; 382/275; 362/217.05; 257/88; 250/227.11

(58) Field of Classification Search
CPC .......... H04N 2201/03125; H04N 2201/03112; H04N 2201/03133; H04N 2201/03141; H04N 2201/03145; H04N 1/0318; H04N 2201/0317; H04N 1/02815; H04N 1/02865; H04N 1/02825; H04N 1/02835
See application file for complete search history.

(56) References Cited

U.S. PATENT DOCUMENTS

| | | | | |
|---|---|---|---|---|
| 7,209,268 B2* | 4/2007 | Ikeda | ............................ | 358/475 |
| 7,659,503 B2* | 2/2010 | Shoji et al. | ............... | 250/227.11 |
| 7,903,298 B2* | 3/2011 | Sawada et al. | ................ | 358/484 |
| 7,924,478 B2* | 4/2011 | Kim et al. | ...................... | 358/484 |
| 7,954,988 B2* | 6/2011 | Lee et al. | ....................... | 362/555 |
| 8,218,205 B2* | 7/2012 | Nagatani et al. | ............... | 358/475 |
| 8,310,737 B2* | 11/2012 | Nagao et al. | ................... | 358/475 |
| 8,422,093 B2* | 4/2013 | Ishida | ........................... | 358/475 |
| 8,755,096 B2* | 6/2014 | Yoshida et al. | ................ | 358/475 |
| 8,786,915 B2* | 7/2014 | Kisara et al. | ................... | 358/474 |
| 8,797,609 B2* | 8/2014 | Shimoda et al. | .............. | 358/474 |
| 8,810,867 B2* | 8/2014 | Sawada | .......................... | 358/474 |
| 2009/0003784 A1 | 1/2009 | Kabuki et al. | | |

FOREIGN PATENT DOCUMENTS

JP       2008216409 A      9/2008

* cited by examiner

*Primary Examiner* — Negussie Worku
(74) *Attorney, Agent, or Firm* — Alleman Hall McCoy Russell & Tuttle LLP (57) ABSTRACT

In an illumination device that radiates light to an object to be irradiated placed on a predetermined placement surface, a first light guide body has a first incident surface located at an end thereof in a first direction, which receives light along the first direction, and a first exit surface extending along the first direction, which emits the light in a second direction crossing the first direction, thereby radiating light to the object to be irradiated, from the second direction, and a second light guide body has a second incident surface located at an end thereof in the first direction, which receives light along the first direction, and a second exit surface extending along the first direction, which emits the light in a third direction crossing the first direction and the second direction, thereby radiating light to the object to be irradiated, from the third direction.

15 Claims, 8 Drawing Sheets

ILLUMINATION DEVICE, IMAGE READING APPARATUS, AND IMAGE FORMING APPARATUS

INCORPORATION BY REFERENCE

This application is based upon and claims the benefit of priority from the corresponding Japanese Patent Application No. 2013-069778 filed on Mar. 28, 2013, the entire contents of which are incorporated herein by reference.

BACKGROUND

The present disclosure relates to an illumination device, an image reading apparatus, and image forming apparatus using a light guide body for guiding illumination light emitted from a light source.

In an image forming apparatus such as a scanner or a copy machine, an illumination device that radiates light to a document sheet placed on a reading surface is used for optically reading an image of the document sheet. In recent years, an LED (Light Emitting Diode) which has an advantage of high light emission efficiency may be employed as a light source of the illumination device. This type of illumination device needs to radiate light in a line shape to a document sheet. Since an LED is a point light source, a bar-like light guide body and the LED are combined, to generate illumination light in a line shape. The light guide body has an incident surface which is located at one end of the light guide body and into which illumination light emitted from the LED enters, and an exit surface which extends along a longitudinal direction of the light guide body and from which the illumination light is emitted.

As a relevant technique, a technique is known in which one light guide body and a reflection plate extending in parallel to the light guide body are provided for illuminating a document sheet. The light guide body has two exit surfaces, and light emitted from one of the exit surfaces is directly radiated to a document sheet. In addition, light emitted from the other exit surface is reflected by the reflection plate, and then radiated to the document sheet. As a result, lights are radiated to the document sheet from two directions crossing each other.

SUMMARY

An illumination device according to one aspect of the present disclosure is an illumination device that radiates light to an object to be irradiated placed on a predetermined placement surface, and includes a first light guide body, a second light guide body, a first light source, and a second light source. The first light guide body has a bar-like shape elongated in a first direction, and has a first incident surface which is located at an end thereof in the first direction and into which light enters along the first direction, and a first exit surface which extends along the first direction and which emits the light in a second direction crossing the first direction, whereby the first light guide body radiates light to the object to be irradiated, from the second direction. The second light guide body is located via a space from the first light guide body and has a bar-like shape elongated in the first direction. The second light guide body has a second incident surface which is located at an end thereof in the first direction and into which light enters along the first direction, and a second exit surface which extends along the first direction and which emits the light in a third direction crossing the first direction and the second direction, whereby the second light guide body radiates light to the object to be irradiated, from the third direction. The first light source is located so as to oppose to the first incident surface of the first light guide body, and is configured to emit illumination light to enter into the first incident surface. The second light source is located so as to oppose to the second incident surface of the second light guide body, and is configured to emit illumination light to enter into the second incident surface.

An image reading apparatus according to another aspect of the present disclosure includes an illumination device that radiates illumination light to a document sheet as the object to be irradiated, and a light receiving device that receives light reflected from the document sheet and converts the received light into an electric signal. The illumination device radiates light to the object to be irradiated placed on a predetermined placement surface, and includes a first light guide body, a second light guide body, a first light source, and a second light source. The first light guide body has a bar-like shape elongated in a first direction, and has a first incident surface which is located at an end thereof in the first direction and into which light enters along the first direction, and a first exit surface which extends along the first direction and which emits the light in a second direction crossing the first direction, whereby the first light guide body radiates light to the object to be irradiated, from the second direction. The second light guide body is located via a space from the first light guide body and has a bar-like shape elongated in the first direction. The second light guide body has a second incident surface which is located at an end thereof in the first direction and into which light enters along the first direction, and a second exit surface which extends along the first direction and which emits the light in a third direction crossing the first direction and the second direction, whereby the second light guide body radiates light to the object to be irradiated, from the third direction. The first light source is located so as to oppose to the first incident surface of the first light guide body, and is configured to emit illumination light to enter into the first incident surface. The second light source is located so as to oppose to the second incident surface of the second light guide body, and is configured to emit illumination light to enter into the second incident surface. The first direction is a primary scanning direction, and in a sectional view along a direction crossing the first direction, a direction from the first light guide body toward the second light guide body is a secondary scanning direction.

An image forming apparatus according to another aspect of the present disclosure includes an image reading apparatus and an image forming portion. The image reading apparatus includes an illumination device that radiates illumination light to a document sheet as the object to be irradiated, and a light receiving device that receives light reflected from the document sheet and converts the received light into an electric signal. The illumination device radiates light to the object to be irradiated placed on a predetermined placement surface, and includes a first light guide body, a second light guide body, a first light source, and a second light source. The first light guide body has a bar-like shape elongated in a first direction, and has a first incident surface which is located at an end thereof in the first direction and into which light enters along the first direction, and a first exit surface which extends along the first direction and which emits the light in a second direction crossing the first direction, whereby the first light guide body radiates light to the object to be irradiated, from the second direction. The second light guide body is located via a space from the first light guide body and has a bar-like shape elongated in the first direction. The second light guide body has a second incident surface which is located at an end thereof in the first direction and into which light enters along the first direction, and a second exit surface which extends along the first direction and which emits the light in a third direction crossing the first direction and the second direction, whereby the second light guide body radiates light to the object to be irradiated, from the third direction. The first light source is located so as to oppose to the first incident surface of the first light guide body, and is configured to emit illumination light to enter into the first incident surface. The second light source is located so as to oppose to the second incident surface of the second light guide body, and is configured to emit illumination light to enter into the second incident surface. The first direction is a primary scanning direction, and in a sectional view along a direction crossing the first direction, a direction from the first light guide body toward the second light guide body is a secondary scanning direction. The image forming portion is configured to form an image on a sheet based on image data outputted from the image reading apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
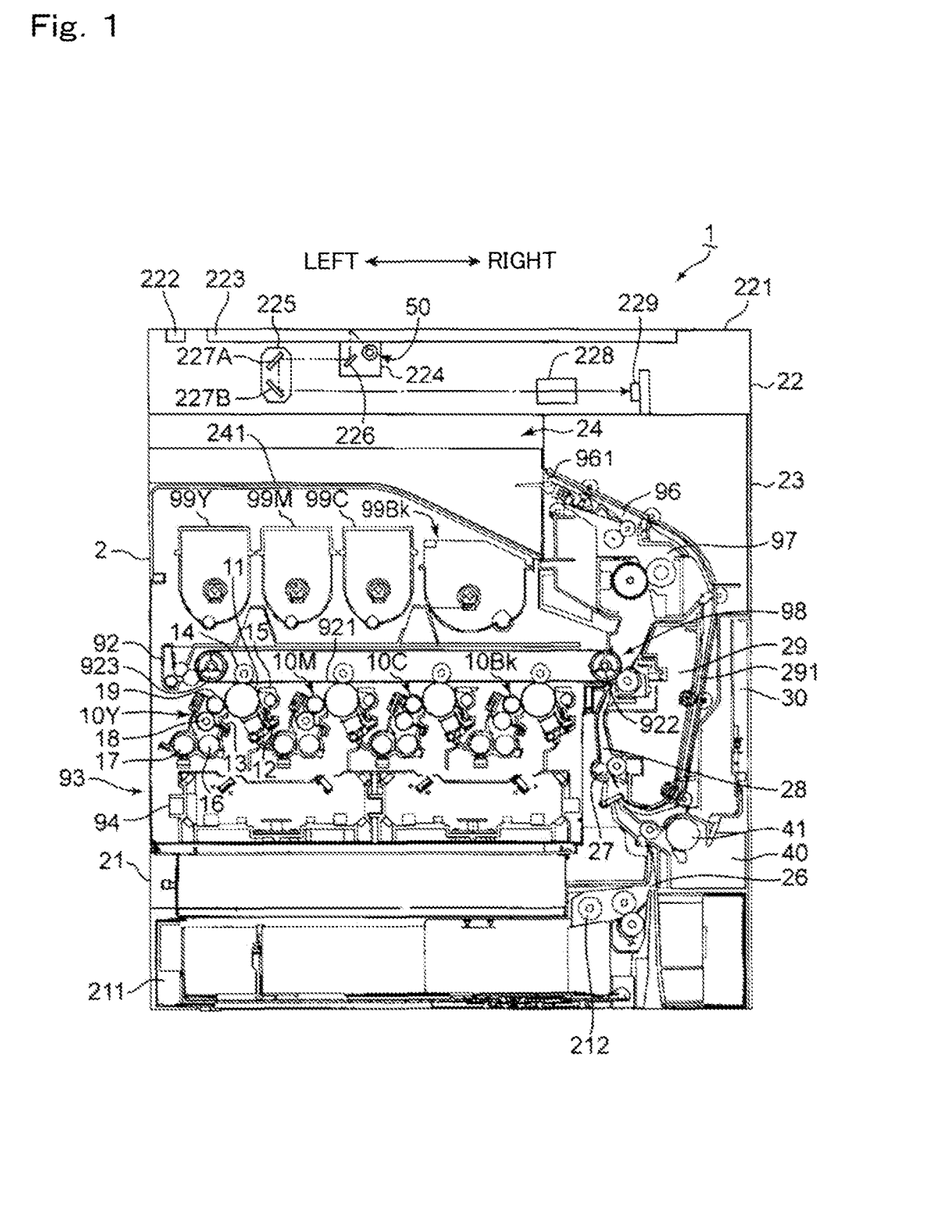
FIG. 1 is a sectional view showing the schematic configuration of an image reading apparatus and an image forming apparatus according to an embodiment of the present disclosure.

Hereinafter, based on the drawings, embodiments of the present disclosure will be described in detail. FIG. 1 is a sectional view showing the internal structure of an image forming apparatus 1 according to an embodiment of the present disclosure. Here, a copy machine of a so-called in-body discharge type is exemplified as the image forming apparatus 1. It is noted that an apparatus to which an illumination device according to the present disclosure is applied is not limited to a copy machine, but may be a scanner apparatus, a facsimile apparatus, or a multifunction peripheral, for example.

The image forming apparatus 1 has a housing 2 having a substantially cuboid-shaped housing structure and having an in-body space (in-body sheet discharge portion 24). The housing 2 includes a lower housing (apparatus main body 21) accommodating various devices for image formation, an upper housing (image reading apparatus 22) provided above the apparatus main body 21, and a connection housing 23 connecting the apparatus main body 21 and the image reading apparatus 22. The image reading apparatus 22 optically reads an image of a document sheet, and generates image data corresponding to the document image. The apparatus main body 21 performs processing of forming a toner image on a sheet based on the image data. The in-body sheet discharge portion 24 to which the sheet after image formation is discharged is provided between the apparatus main body 21 and the image reading apparatus 22. The connection housing 23 is located on a side of a right side surface of the housing 2, and is provided with a discharge outlet 961 for discharging a sheet to the in-body sheet discharge portion 24.

The apparatus main body 21 accommodates therein a toner containers 99Y, 99M, 99C, and 99Bk, an intermediate transfer unit 92, an image forming portion 93, an exposure unit 94, and a sheet feed cassette 211, in this order from above.

The image forming portion 93 forms an image on a sheet based on image data outputted from the image reading apparatus 22. In order to form a full-color toner image, the image forming portion 93 includes four image forming units 10Y, 10M, 10C, and 10Bk for forming respective toner images for yellow (Y), magenta (M), cyan (C), and black (Bk). Each of the image forming units 10Y, 10M, 10C, and 10Bk includes a photosensitive drum 11, and includes a charging device 12, developing device 13, a primary transfer roller 14, and a cleaning device 15 disposed around the photosensitive drum 11.

The photosensitive drum 11 rotates about its axis, so that an electrostatic latent image and a toner image are formed on the circumferential surface thereof. As the photosensitive drum 11, a photosensitive drum formed by an amorphous-silicon- (a-Si)-based material may be used. The charging device 12 uniformly charges the surface of the photosensitive drum 11. The charged circumferential surface of the photosensitive drum 11 is exposed to light by the exposure unit 94, whereby an electrostatic latent image is formed.

In order to develop the electrostatic latent image formed on the photosensitive drum 11, the developing device 13 supplies toner onto the circumferential surface of the photosensitive drum 11. The developing device 13 is of a two-component developer type, and includes agitating rollers 16 and 17, a magnetic roller 18, and a developing roller 19. The agitating rollers 16 and 17 convey a two-component developer in a circulated manner while agitating the two-component developer, thereby charging toner. A two-component developer layer is carried on the circumferential surface of the magnetic roller 18, and then the toner is transferred onto the circumferential surface of the developing roller 19 by a potential difference between the magnetic roller 18 and the developing roller 19, whereby a toner layer is formed and carried on the circumferential surface of the developing roller 19. The toner on the developing roller 19 is supplied onto the circumferential surface of the toner photosensitive drum 11, whereby the electrostatic latent image is developed.

The primary transfer roller 14 forms a nip portion together with the photosensitive drum 11 via an intermediate transfer belt 921 included in the intermediate transfer unit 92, and primarily transfers a toner image on the photosensitive drum 11 onto the intermediate transfer belt 921. The cleaning device 15 cleans the circumferential surface of the photosensitive drum 11 after the toner image transfer.

The yellow toner container 99Y, the magenta toner container 99M, the cyan toner container 99C, and the black toner container 99Bk store toners for their respective colors, and supply toners for the respective colors through supply routes (not shown) to the developing devices 13 of the image forming units 10Y, 10M, 10C, and 10Bk corresponding to the respective colors of Y M C, and Bk.

The exposure unit 94 has various optical devices such as a light source, a polygon mirror, a reflection mirror, and a deflection mirror. The exposure unit 94 radiates light based on image data of a document image to the circumferential surface of the photosensitive drum 11 provided in each of the image forming units 10Y, 10M, 10C, and 10Bk, thereby forming an electrostatic latent image.

The intermediate transfer unit 92 includes the intermediate transfer belt 921, a drive roller 922, and a driven roller 923. Toner images from the plurality of photosensitive drums 11 are applied in an overlapping manner onto the intermediate transfer belt 921 (primary transfer). The toner images applied in an overlapped manner are secondarily transferred onto a sheet fed from the sheet feed cassette 211 or a sheet feed tray 30, in a secondary transfer portion 98. The drive roller 922 and the driven roller 923 for driving the intermediate transfer belt 921 to circulate are rotatably supported by the apparatus main body 21.

The sheet feed cassette 211 accommodates a sheet bundle composed of a plurality of stacked sheets. A pickup roller 212 is provided at an upper portion on the right side of the sheet feed cassette 211. The pickup roller 212 is driven to feed one by one an uppermost sheet of the sheet bundle in the sheet feed cassette 211 and convey the sheet to a carry-in conveyance path 26. It is noted that a sheet feed unit 40 including the sheet feed tray 30 for manual feed is provided on the right side surface of the apparatus main body 21. A sheet placed on the sheet feed tray 30 is carried into the carry-in conveyance path 26 by the sheet feed roller 41 of the sheet feed unit 40 being driven.

On the downstream side of the carry-in conveyance path 26, a sheet conveyance path 28 is provided which extends through the secondary transfer portion 98, and a fixing unit 97 and a sheet discharge unit 96 described later, to the discharge outlet 961. An upstream portion of the sheet conveyance path 28 is formed between an inner wall formed in the apparatus main body 21 and an inner wall forming an inner side surface of a reverse conveyance unit 29. It is noted that an outer side surface of the reverse conveyance unit 29 forms one surface of a reverse conveyance path 291 through which a sheet is reversely conveyed upon both-side printing. A registration roller pair 27 is provided upstream of the secondary transfer portion 98 on the sheet conveyance path 28. A sheet is stopped by the registration roller pair 27 once, to perform skew correction, and then the sheet is fed to the secondary transfer portion 98 at a predetermined timing for image transfer.

The connection housing 23 accommodates therein the fixing unit 97 and the sheet discharge unit 96. The fixing unit 97 includes a fixing roller and a pressurizing roller, and heats and pressurizes a sheet having a toner image secondarily transferred thereon in the secondary transfer portion 98, thereby performing fixing processing. The sheet having a color image after the fixing processing is discharged through the discharge outlet 961 to the in-body sheet discharge portion 24 by the sheet discharge unit 96 located downstream of the fixing unit 97.

The image reading apparatus 22 includes a first contact glass 222 and a second contact glass 223 fitted into an upper surface 221 of the upper housing. In the case where an automatic document feeder (ADF; not shown) is provided on the image reading apparatus 22, the first contact glass 222 is provided for reading a document sheet automatically fed by the ADF. The second contact glass 223 is provided for reading a document sheet manually placed.

The image reading apparatus 22 includes a first movement carriage 224, a second movement carriage 225, a converging lens unit 228, and an imaging device 229 (light receiving device), which are accommodated in the upper housing. On the first movement carriage 224, an illumination device 50 according to the embodiment of the present disclosure and a first reflection mirror 226 are provided. On the second movement carriage 225, a second reflection mirror 227A and a third reflection mirror 227B are provided for inverting an optical path.

The first movement carriage 224 can move both rightward and leftward along lower surfaces of the first contact glass 222 and the second contact glass 223.

The second movement carriage 225 can move both rightward and leftward by the half of the movement amount of the first movement carriage 224. In an automatic feed mode in which a document sheet is automatically fed from the automatic document feeder (not shown), the first movement carriage 224 moves just under the first contact glass 222, to become a static state. In the static state, light is emitted from the illumination device 50 to a document sheet. On the other hand, in a manual placement mode in which a document sheet is placed on the second contact glass 223, the first movement carriage 224 moves from just under the left end of the second contact glass 223 to the right side in accordance with the size of the document sheet. Upon the movement, light is emitted from the illumination device 50 to the document sheet. The second movement carriage 225 moves rightward so as to follow the first movement carriage 224, by the half of the movement amount of the first movement carriage 224.

The illumination device 50 radiates illumination light in a line shape elongated in a primary scanning direction, to a document sheet as an object to be irradiated. Specifically, the illumination device 50 emits illumination light for optically reading a document sheet image, to an automatically fed document sheet passing on the first contact glass 222 or a manually placed document sheet placed on the second contact glass 223. The first reflection mirror 226 reflects light reflected from the document sheet when the illumination device 50 has radiated the illumination light thereto, toward the second reflection mirror 227A of the second movement carriage 225.

The second reflection mirror 227A reflects the light reflected by the first reflection mirror 226, toward the third reflection mirror 227B. The third reflection mirror 227B reflects the reflected light toward the converging lens unit 228. The converging lens unit 228 forms an optical image of the light reflected by the third reflection mirror 227B, on an imaging surface of the imaging device 229. The imaging device 229 is composed of a CCD (charge coupled device) or the like, and receives the reflected light and performs photoelectric conversion therefor into an analog electric signal. The analog electric signal is converted into a digital electric signal by an A/D conversion circuit (not shown), and then inputted as image data to the above-described exposure unit 94.

It is noted that a white reference board (not shown) for determining a white reference of reading density is provided on the left end side of the second contact glass 223. Before image reading operation, illumination light is radiated to the white reference board, light reflected therefrom is received by the imaging device 229, and then a correction value is acquired in advance such that output of image data at this time becomes uniform in the primary scanning direction (shading correction).

Figure 2:
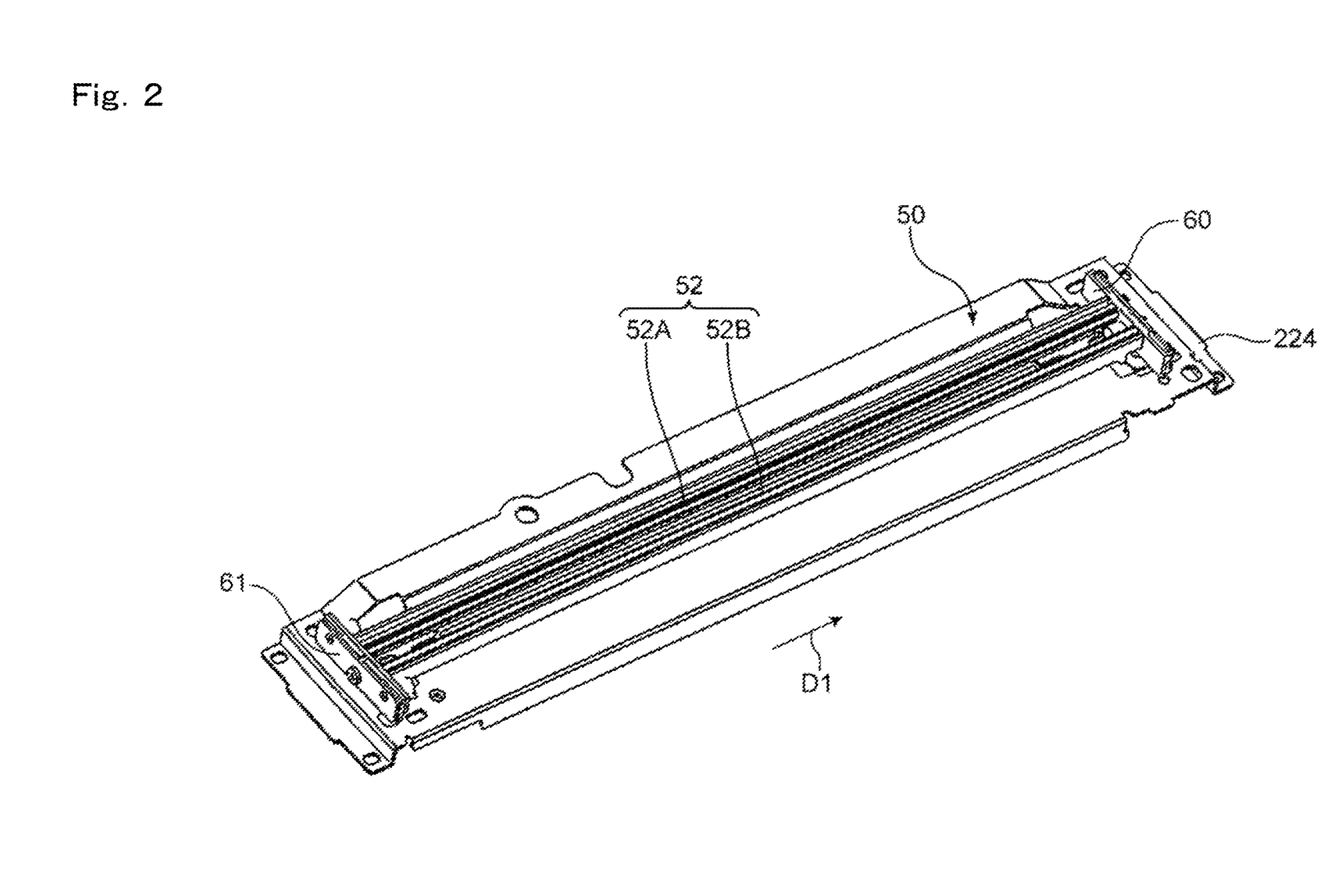
FIG. 2 is a perspective view showing an illumination device according to the embodiment of the present disclosure.
Figure 3:
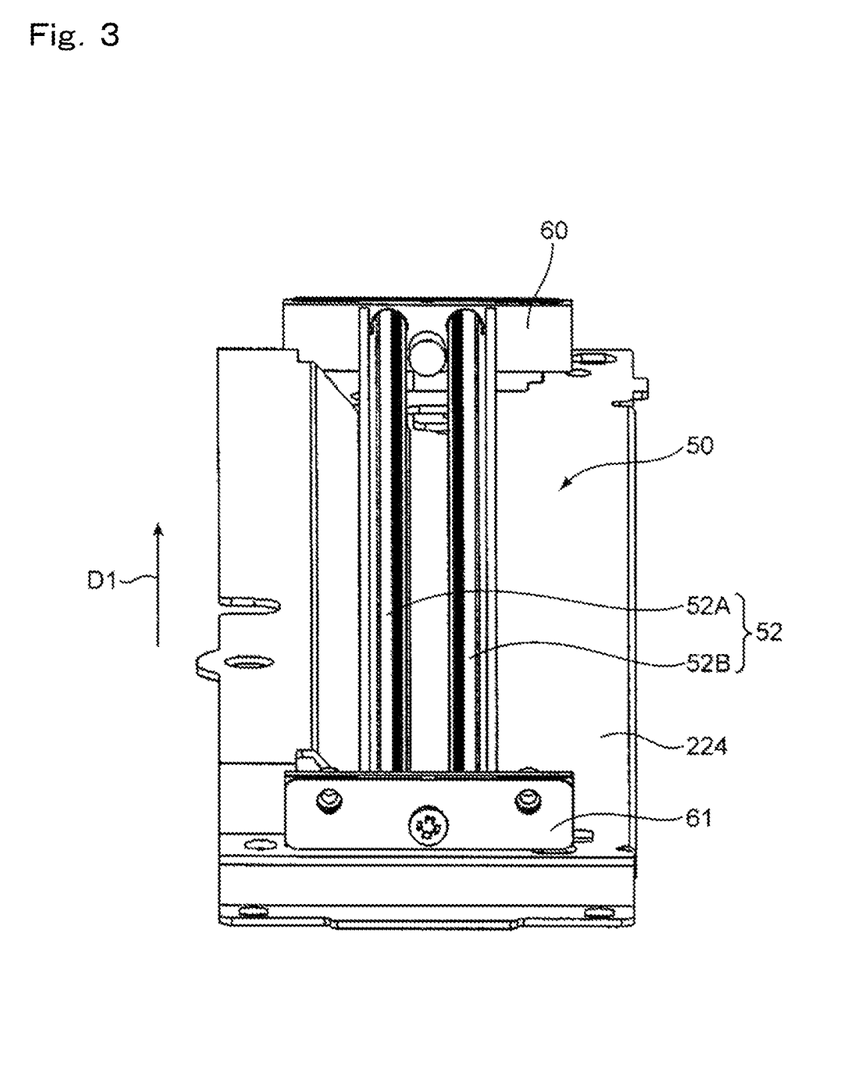
FIG. 3 is a perspective view showing the illumination device according to the embodiment of the present disclosure.
Figure 4:
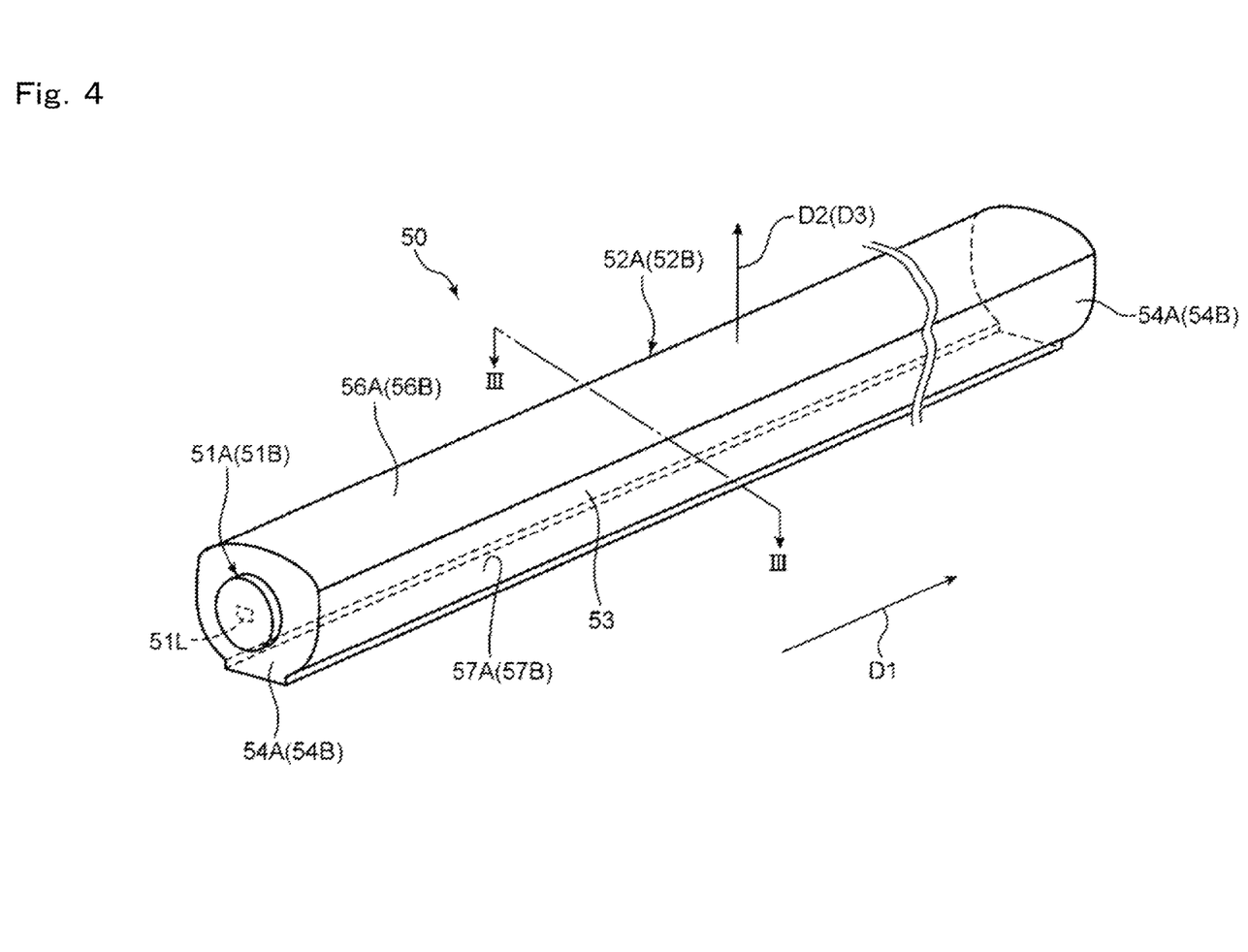
FIG. 4 is a perspective view showing a light guide body according to the embodiment of the present disclosure.
Figure 5:
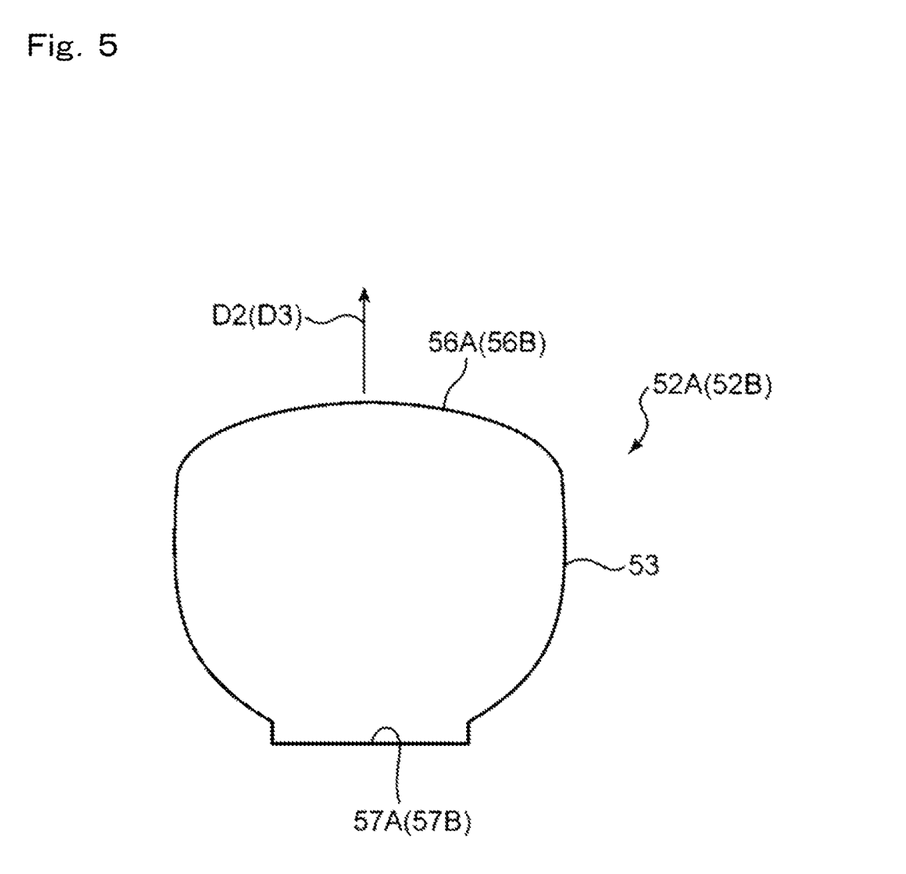
FIG. 5 is a sectional view of the light guide body shown in FIG. 4.
Figure 6:
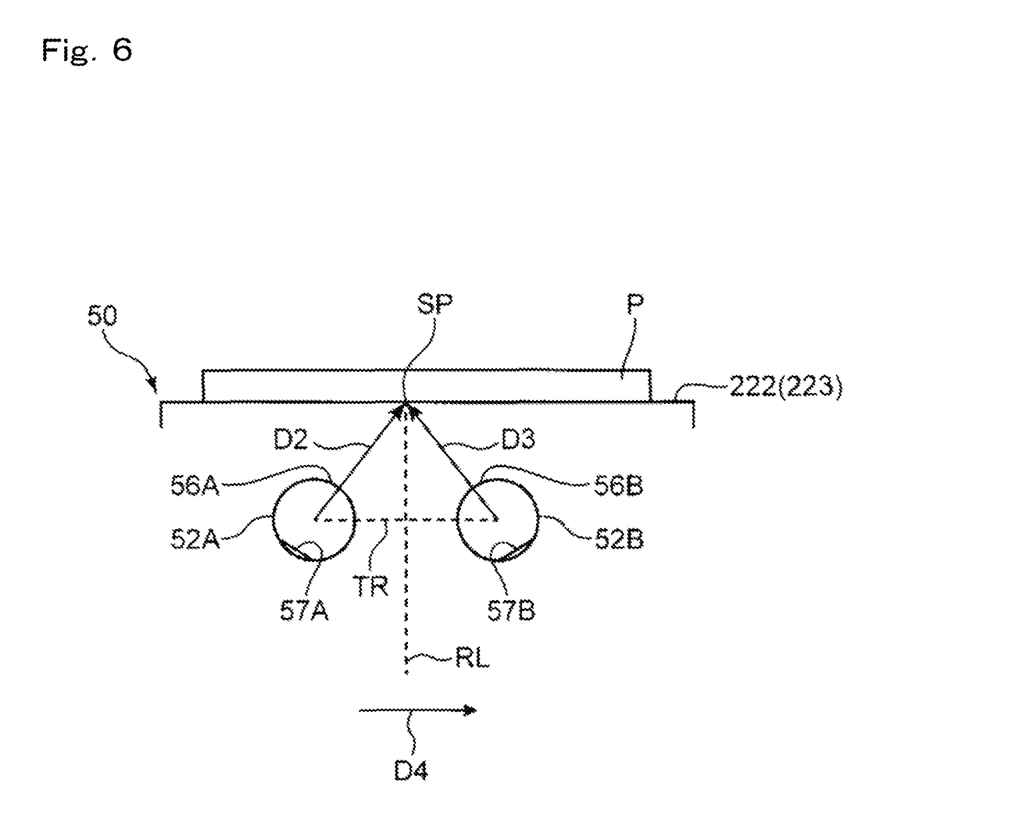
FIG. 6 is a schematic sectional view of the illumination device according to the embodiment of the present disclosure.
Figure 7:
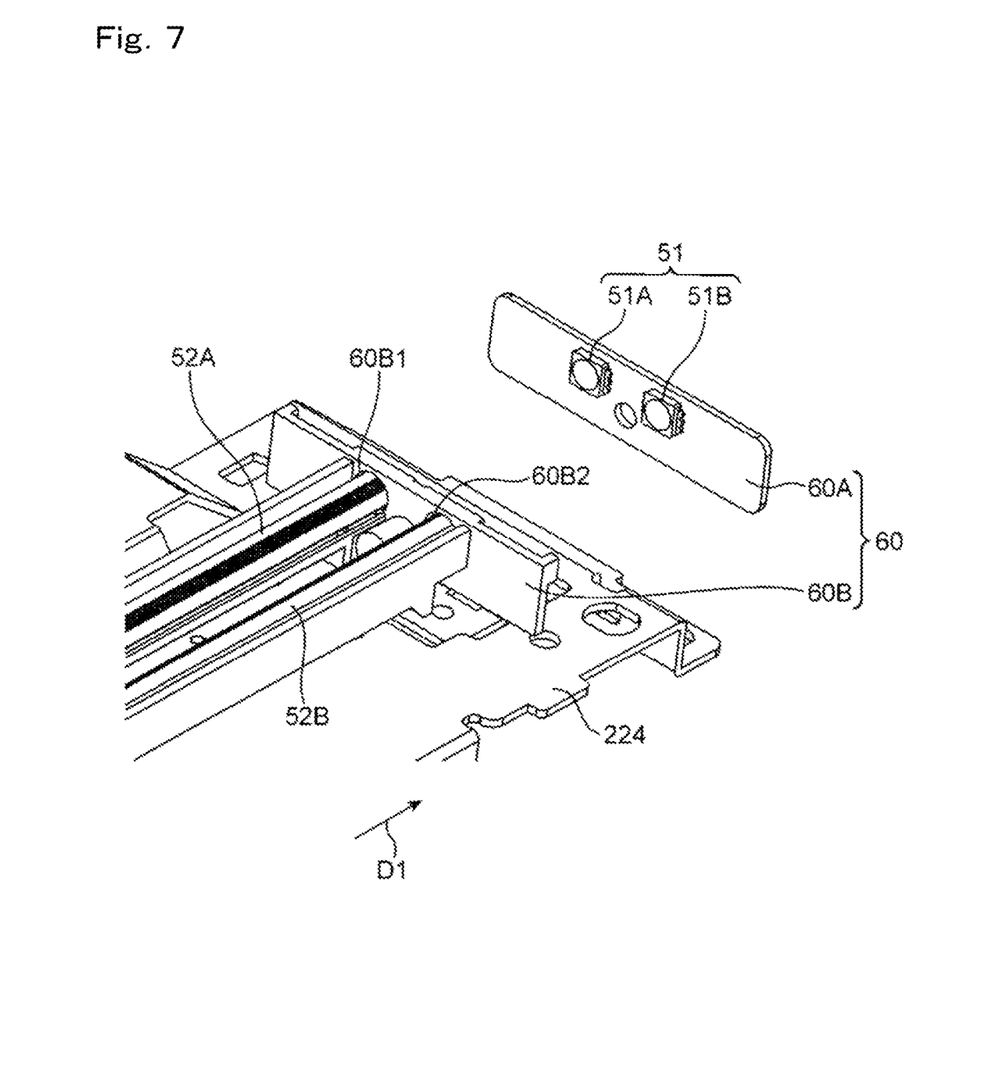
FIG. 7 is an exploded perspective view of the illumination device according to the embodiment of the present disclosure.
Figure 8:
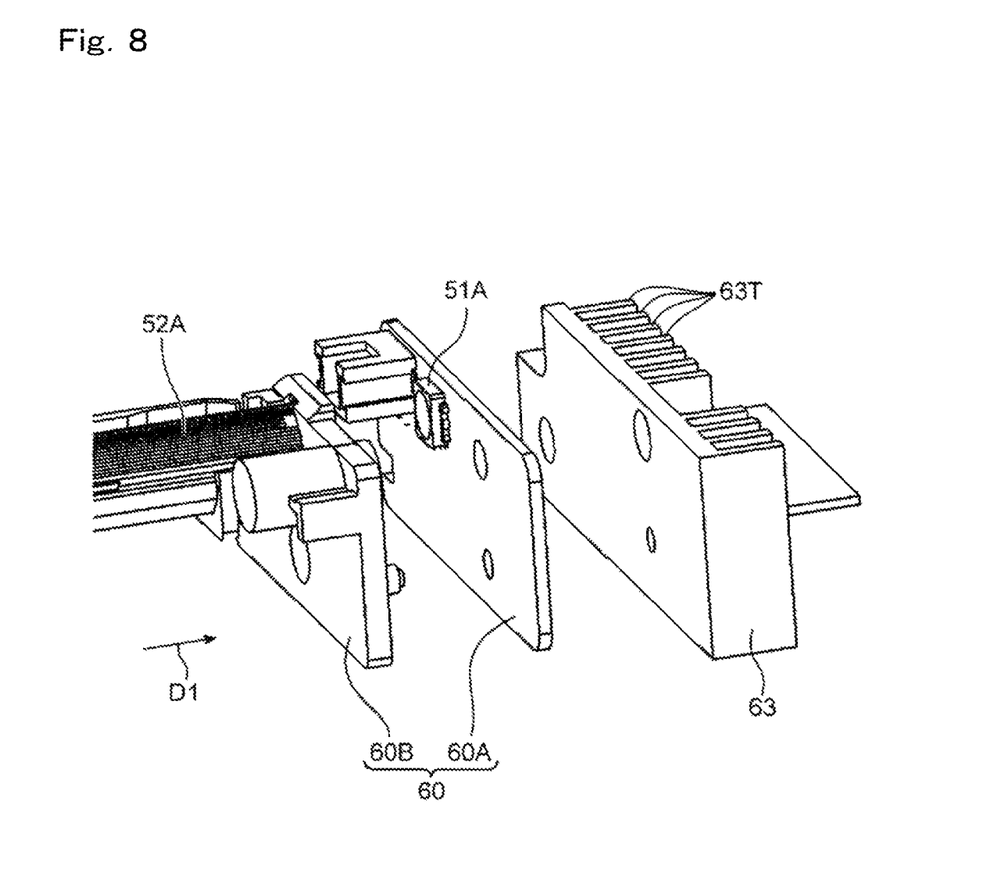
FIG. 8 is an exploded perspective view of the illumination device according to the embodiment of the present disclosure.

Next, the details of the illumination device 50 according to the embodiment of the present disclosure will be described. FIGS. 2 and 3 are perspective views of the illumination device 50 on the first movement carriage 224. In addition, FIG. 4 is a perspective view of a first light guide body 52A of the illumination device 50, and FIG. 5 is a sectional view of the first light guide body 52A. Further, FIG. 6 is a schematic sectional view showing placement of each light guide body of the illumination device 50. In addition, FIGS. 7 and 8 are exploded perspective views of the illumination device 50.

In the above-described relevant technique, lights are emitted from two exit surfaces of one light guide body. Therefore, in order to radiate strong light to a document sheet, it is required that an LED attached to the one light guide body has a high light emission amount. As a result, in addition to cost increase in the LED, a problem arises that a heat dissipating member for dissipating heat generated by the LED is needed. On the other hand, as compared to the illumination device using the one light guide body, the illumination device 50 according to the embodiment of the present disclosure can radiate a larger amount of light to an object to be irradiated, and can reduce the amount of heat generated by the light source as much as possible.

The illumination device 50 radiates light with its focal position being on a document sheet (object to be irradiated) placed on the first contact glass 222 or the second contact glass 223 (predetermined placement surface). The illumination device 50 is disposed along the primary scanning direction (first direction, arrow D1 in FIGS. 2 and 3) on the first movement carriage 224.

The illumination device 50 includes a light source 51 (see FIG. 7) and a light guide body 52. The light guide body 52 propagates illumination light emitted from the light source 51, and emits illumination light converted into a line shape. The light source 51 includes a first light source 51A and a second light source 51B. In addition, the light guide body 52 includes the first light guide body 52A and a second light guide body 52B.

The first light guide body 52A has a bar-like shape elongated in the first direction. The first light guide body 52A has a first incident surface 54A and a first exit surface 56A (FIG. 4). The first incident surface 54A is located at an end in the first direction of the first light guide body 52A, and light enters into the first incident surface 54A along the first direction. In the present embodiment, a pair of first incident surfaces 54A are located at both ends in the first direction of the first light guide body 52A. The first exit surface 56A extends along the first direction, and emits the light in a second direction (arrow D2 in FIGS. 4 and 6) which crosses the first direction. The first light guide body 52A radiates light to a document sheet from the second direction.

The second light guide body 52B is located via a space from the first light guide body 52A, and has a bar-like shape elongated in the first direction. The second light guide body 52B has a second incident surface 54B and a second exit surface 56B. The second incident surface 54B is located at an end in the first direction of the second light guide body 52B, and light enters into the second incident surface 54B along the first direction. In the present embodiment, a pair of second incident surfaces 54B are located at both ends in the first direction of the second light guide body 52B. The second exit surface 56B extends along the first direction, and emits the light in a later-described third direction (arrow D3 in FIGS. 4 and 6) which crosses the first direction and the second direction. The second light guide body 52B radiates light to a document sheet from the third direction.

The light source 51 (first light source 51A and second light source 51B) has a thin disk-like shape, and has a white LED (Light Emitting Diode) 51L for emitting white light. As the white LED 51L, for example, a high luminance LED package can be used in which a GaN-based or InGaN-based semiconductor light emitting device that emits blue light or ultraviolet light is sealed by a transparent resin containing a fluorescent material.

In the present embodiment, a pair of the first light sources 51A and a pair of the second light sources 51B are located at both ends of the first light guide body 52A and both ends of second light guide body 52B, respectively. That is, the pair of first light sources 51A are located so as to respectively oppose to the pair of first incident surfaces 54A of the first light guide body 52A, and emit illumination lights to enter into the respective first incident surfaces 54A. In addition, the pair of the second light sources 51B are located so as to respectively oppose to the pair of second incident surfaces 54B of the second light guide body 52B, and emit illumination lights to enter into the respective second incident surfaces 54B.

Next, with reference to FIGS. 4 and 5, the structures of the first light guide body 52A and the second light guide body 52B will be further described. It is noted that in the present embodiment, the second light guide body 52B has the same structure as that of the first light guide body 52A, and the first light guide body 52A and the second light guide body 52B are different in their placements in the illumination device 50. Therefore, in FIGS. 4 and 5, mainly, the structure of the first light guide body 52A will be described as an example. In addition, in FIGS. 4 and 5, reference signs of elements of the second light guide body 52B that correspond to those of the first light guide body 52A are shown in parentheses.

The first light guide body 52A is made of a transparent resin material such as acrylic resin, and has a bar-like shape elongated in the primary scanning direction (first direction). The first light guide body 52A includes a main body portion 53 for guiding illumination light emitted from the first light source 51A, and the pair of first incident surfaces 54A which are both end surfaces in the first direction of the main body portion 53 and into which the illumination light enters. The light emitting surfaces of the pair of first light sources 51A are located so as to oppose to the pair of first incident surfaces 54A, respectively. It is noted that in FIG. 4, the first light source 51A on the far end side in the first direction is not shown.

The first light guide body 52A further includes the first exit surface 56A located on the upper surface side (a side opposing to the first and second contact glasses 222 and 223) of the main body portion 53, and a first reflection surface 57A located on the lower surface side of the main body portion 53 so as to oppose to the first exit surface 56A. The first exit surface 56A extends along the primary scanning direction (first direction) on the upper surface of the main body portion 53, and has a predetermined width in a direction perpendicular to the primary scanning direction, and the illumination light is emitted from the first exit surface 56A toward the first and second contact glasses 222 and 223 (document sheet). The direction in which the illumination light is emitted from the first exit surface 56A is defined as the second direction (arrow D2 in FIGS. 4 and 5). Similarly, the first reflection surface 57A is a belt-like surface extending in the primary scanning direction, and reflects the illumination light propagated in the main body portion 53, toward the first exit surface 56A. The first exit surface 56A has a curved surface that is a comparatively mild convex in a direction crossing the primary scanning direction. On the other hand, the first reflection surface 57A is a flat surface. A large number of minute prisms (not shown) are provided on the first reflection surface 57A. Light is reflected by the prisms toward the first exit surface 56A.

As previously described, the second light guide body 52B has the same structure as that of the first light guide body 52A. That is, the second light guide body 52B also includes a main body portion 53. The first incident surface 54A, the first exit surface 56A, and the first reflection surface 57A of the first light guide body 52A respectively correspond to the second incident surface 54B, the second exit surface 56B, and a second reflection surface 57B of the second light guide body 52B. It is noted that a direction in which illumination light is emitted from the second exit surface 56B is defined as the third direction (arrow D3 in FIGS. 4 and 5). Since the first light guide body 52A and the second light guide body 52B thus have the same shape and structure, it suitably becomes possible to use a common light guide body for the two light guide bodies.

Further, with reference to FIG. 2, the illumination device 50 includes a first plate 60, a second plate 61, and a heat dissipation unit 63 (FIG. 8). The first plate 60 and the second plate 61 are plate-like members standing upward from the first movement carriage 224. The first plate 60 supports the first light guide body 52A and the second light guide body 52B, on one end side in the first direction. In addition, the second plate 61 supports the first light guide body 52A and the second light guide body 52B, on the other end side in the first direction.

With reference to FIGS. 7 and 8, the first plate 60 includes an eleventh plate 60A and a twelfth plate 60B. The eleventh plate 60A and the twelfth plate 60B are plate-like members located opposing to each other. The eleventh plate 60A supports the first light source 51A and the second light source 51B. In addition, the twelfth plate 60B supports the first light guide body 52A and the second light guide body 52B, and exposes the first incident surface 54A and the second incident surface 54B (FIG. 4) so as to oppose to the first light source 51A and the second light source 51B. In detail, the twelfth plate 60B has a first opening 60B1 and a second opening 60B2. One end of the first light guide body 52A and one end of the second light guide body 52B are inserted into the first opening 60B1 and the second opening 60B2, respectively. As a result, the first incident surface 54A and the second incident surface 54B are exposed to the eleventh plate 60A side. The eleventh plate 60A is attached to the twelfth plate 60B, whereby the first light source 51A and the second light source 51B are located so as to oppose to the first incident surface 54A and the second incident surface 54B. It is noted that the second plate 61 has the same structure as that of the first plate 60.

The heat dissipation unit 63 is located in contact with the eleventh plate 60A. The heat dissipation unit 63 includes a heat dissipation rib 63T. The heat dissipation rib 63T increases the surface area of the heat dissipation unit 63. Therefore, the heat dissipation unit 63 functions as a heat sink. The heat dissipation unit 63 is attached to the first plate 60, whereby heat generated along with light emission of the first light source 51A and the second light source 51B is transferred from the eleventh plate 60A to the heat dissipation unit 63. Then, the heat is suitably discharged from the heat dissipation rib 63T to the outside of the illumination device 50.

Next, with reference to FIG. 6, the direction of radiated light in the present embodiment will be described. The first light guide body 52A and the second light guide body 52B are each inclined by a predetermined angle such that their exit surfaces face to each other. As previously described, the first light guide body 52A radiates light of the first light source 51A to a document sheet P from the second direction. The second light guide body 52B radiates light of the second light source 51B to the document sheet P from the third direction. That is, in a sectional view along a direction crossing the first direction shown in FIG. 6, the second direction is a direction toward the document sheet P from one side with respect to a normal line RL perpendicular to the first contact glass 222 or the second contact glass 223 (placement surface), of the placement surface side. In addition, the third direction is a direction toward the document sheet P from the other side with respect to the normal line RL, of the placement surface side. That is, lights can be stably radiated to the document sheet P from both sides with respect to the normal line RL. Further, in the present embodiment, in the sectional view, a triangle TR connecting the first light guide body 52A, the second light guide body 52B, and a focal point SP of radiated light is an isosceles triangle having the focal point SP as its apex. Therefore, the distribution of lights radiated to the document sheet P from the first light guide body 52A and the second light guide body 52B has line symmetry in a sectional view along a direction crossing the first direction. Therefore, even if lights radiated from the first light guide body 52A and the second light guide body 52B overlap with each other, uniform light can be radiated to the document sheet P. In other words, on the document sheet P side, the amount of light on one side with respect to the normal line RL is prevented from becoming smaller than the amount of light on the other side. It is noted that in another embodiment, the triangle TR connecting the first light guide body 52A, the second light guide body 52B, and the focal point SP of radiated light may be an equilateral triangle.

In the above configuration, the first direction corresponds to the primary scanning direction of the image reading apparatus 22, and a direction (arrow D4 in FIG. 6) toward the second light guide body 52B from the first light guide body 52A in a sectional view along a direction crossing the first direction corresponds to a secondary scanning direction. Lights are radiated from two light guide bodies (first light guide body 52A and second light guide body 52B) to a document sheet P as an object to be irradiated. Two light sources (first light sources 51A and second light sources 51B) are respectively provided for each of the two light guide bodies. Therefore, as compared to the case of radiating light from one light guide body, a larger amount of light can be radiated to a document sheet P. In addition, since a small light emission amount is sufficient for each light source, the amount of heat generated by each light source can be reduced. Therefore, thermal deformation of the first light guide body 52A and the second light guide body 52B or a member around them due to the heat can be suitably suppressed. As a result, stable light is radiated to a document sheet. Therefore, in the image reading apparatus 22, an image of the document sheet is suitably read, and in the image forming apparatus 1, an image based on image data of the document sheet is suitably formed on a sheet.

Thus, a preferred embodiment of the present disclosure has been described. However, the present disclosure is not limited thereto, but may employ the following modification of the embodiment, for example.

In the above embodiment, a pair of first incident surfaces 54A and a pair of first light sources 51A are provided at both ends in the first direction of the first light guide body 52A, and a pair of second incident surfaces 54B and a pair of second light sources 51B are provided at both ends in the first direction of the second light guide body 52B. However, the present disclosure is not limited thereto. The first incident surface 54A and the first light source 51A may be provided on one end in the first direction of the first light guide body 52A, and the second incident surface 54B and the second light source 51B may be provided at the other end in the first direction of the second light guide body 52B, which is opposite to the one end. Also in this case, as compared to the case of radiating light to a document sheet P from one light guide body, a larger amount of light can be radiated to a document sheet P. In addition, the amount of heat generated by each light source can be reduced. In addition, since in the first direction, the first light source 51A and the second light source 51B are provided on the respective opposite sides, the amount of downstream light in the light emitting direction emitted from one light source, which is more likely to attenuate, can be compensated by the amount of upstream light in the light emitting direction emitted from the other light source. Therefore, light that is uniform along the first direction is radiated to a document sheet P. It is noted that in this configuration, it is desirable that a reflection sheet is provided on the surface opposite to the incident surface, of each light guide body.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An illumination device that radiates light to an object to be irradiated placed on a predetermined placement surface, the illumination device comprising:
   a first light guide body having a bar-like shape elongated in a first direction, and having a first incident surface which is located at an end thereof in the first direction and into which light enters along the first direction, and a first exit surface which extends along the first direction and which emits the light in a second direction crossing the first direction, the first light guide body thereby radiating light to the object to be irradiated, from the second direction;
   a second light guide body located via a space from the first light guide body and having a bar-like shape elongated in the first direction, the second light guide body having a second incident surface which is located at an end thereof in the first direction and into which light enters along the first direction, and a second exit surface which extends along the first direction and which emits the light in a third direction crossing the first direction and the second direction, the second light guide body thereby radiating light to the object to be irradiated, from the third direction;
   a first light source located so as to oppose to the first incident surface of the first light guide body, and configured to emit illumination light to enter into the first incident surface; and
   a second light source located so as to oppose to the second incident surface of the second light guide body, and configured to emit illumination light to enter into the second incident surface.

2. The illumination device according to claim 1, wherein in a sectional view along a direction crossing the first direction,
   the second direction is a direction toward the object to be irradiated, from one side with respect to a normal line perpendicular to the placement surface, of the placement surface side, and
   the third direction is a direction toward the object to be irradiated, from the other side with respect to the normal line, of the placement surface side.

3. The illumination device according to claim 2, wherein the object to be irradiated is placed at a position of a focal point of light emitted from the first light guide body and the second light guide body, and
   in the sectional view, a triangle connecting the first light guide body, the second light guide body, and the focal point is an equilateral triangle or an isosceles triangle having the focal point as an apex thereof.

4. The illumination device according to claim 1, wherein
   a pair of the first incident surfaces and a pair of the first light sources are located at both ends in the first direction of the first light guide body, and
   a pair of the second incident surfaces and a pair of the second light sources are located at both ends in the first direction of the second light guide body.

5. The illumination device according to claim 1, wherein
   the first incident surface and the first light source are located at one end in the first direction of the first light guide body, and
   the second incident surface and the second light source are located at the other end in the first direction of the second light guide body, which is opposite to the one end.

6. An image reading apparatus comprising: an illumination device configured to radiate illumination light to a document sheet as the object to be irradiated; and a light receiving device configured to receive light reflected from the document sheet and convert the received light into an electric signal, the illumination device including:
   a first light guide body having a bar-like shape elongated in a first direction, and having a first incident surface which is located at an end thereof in the first direction and into which light enters along the first direction, and a first exit surface which extends along the first direction and which emits the light in a second direction crossing the first direction, the first light guide body thereby radiating light to the object to be irradiated, from the second direction;
   a second light guide body located via a space from the first light guide body and having a bar-like shape elongated in the first direction, the second light guide body having a second incident surface which is located at an end thereof in the first direction and into which light enters along the first direction, and a second exit surface which extends along the first direction and which emits the light in a third direction crossing the first direction and the second direction, the second light guide body thereby radiating light to the object to be irradiated, from the third direction;
   a first light source located so as to oppose to the first incident surface of the first light guide body, and configured to emit illumination light to enter into the first incident surface; and
   a second light source located so as to oppose to the second incident surface of the second light guide body, and configured to emit illumination light to enter into the second incident surface, wherein
   the first direction is a primary scanning direction, and in a sectional view along a direction crossing the first direction, a direction from the first light guide body toward the second light guide body is a secondary scanning direction.

7. The image reading apparatus according to claim 6, wherein in a sectional view along a direction crossing the first direction, the second direction is a direction toward the object to be irradiated, from one side with respect to a normal line perpendicular to the placement surface, of the placement surface side, and the third direction is a direction toward the object to be irradiated, from the other side with respect to the normal line, of the placement surface side.

8. The image reading apparatus according to claim 7, wherein the object to be irradiated is placed at a position of a focal point of light emitted from the first light guide body and the second light guide body, and in the sectional view, a triangle connecting the first light guide body, the second light guide body, and the focal point is an equilateral triangle or an isosceles triangle having the focal point as an apex thereof.

9. The image reading apparatus according to claim 6, wherein a pair of the first incident surfaces and a pair of the first light sources are located at both ends in the first direction of the first light guide body, and a pair of the second incident surfaces and a pair of the second light sources are located at both ends in the first direction of the second light guide body.

10. The image reading apparatus according to claim 6, wherein the first incident surface and the first light source are located at one end in the first direction of the first light guide body, and the second incident surface and the second light source are located at the other end in the first direction of the second light guide body, which is opposite to the one end.

11. An image forming apparatus comprising an image reading apparatus and an image forming portion, the image reading apparatus including: an illumination device configured to radiate illumination light to a document sheet as the object to be irradiated; and a light receiving device configured to receive light reflected from the document sheet and convert the received light into an electric signal, the illumination device including:

a first light guide body having a bar-like shape elongated in a first direction, and having a first incident surface which is located at an end thereof in the first direction and into which light enters along the first direction, and a first exit surface which extends along the first direction and which emits the light in a second direction crossing the first direction, the first light guide body thereby radiating light to the object to be irradiated, from the second direction;

a second light guide body located via a space from the first light guide body and having a bar-like shape elongated in the first direction, the second light guide body having a second incident surface which is located at an end thereof in the first direction and into which light enters along the first direction, and a second exit surface which extends along the first direction and which emits the light in a third direction crossing the first direction and the second direction, the second light guide body thereby radiating light to the object to be irradiated, from the third direction;

a first light source located so as to oppose to the first incident surface of the first light guide body, and configured to emit illumination light to enter into the first incident surface; and a second light source located so as to oppose to the second incident surface of the second light guide body, and configured to emit illumination light to enter into the second incident surface, wherein the first direction is a primary scanning direction, and in a sectional view along a direction crossing the first direction, a direction from the first light guide body toward the second light guide body is a secondary scanning direction, and the image forming portion is configured to form an image on a sheet based on image data outputted from the image reading apparatus.

12. The image forming apparatus according to claim 11, wherein in a sectional view along a direction crossing the first direction, the second direction is a direction toward the object to be irradiated, from one side with respect to a normal line perpendicular to the placement surface, of the placement surface side, and the third direction is a direction toward the object to be irradiated, from the other side with respect to the normal line, of the placement surface side.

13. The image forming apparatus according to claim 12, wherein the object to be irradiated is placed at a position of a focal point of light emitted from the first light guide body and the second light guide body, and in the sectional view, a triangle connecting the first light guide body, the second light guide body, and the focal point is an equilateral triangle or an isosceles triangle having the focal point as an apex thereof.

14. The image forming apparatus according to claim 11, wherein a pair of the first incident surfaces and a pair of the first light sources are located at both ends in the first direction of the first light guide body, and a pair of the second incident surfaces and a pair of the second light sources are located at both ends in the first direction of the second light guide body.

15. The image forming apparatus according to claim 11, wherein the first incident surface and the first light source are located at one end in the first direction of the first light guide body, and the second incident surface and the second light source are located at the other end in the first direction of the second light guide body, which is opposite to the one end.

* * * * *